(12) United States Patent
Ryobo et al.

(10) Patent No.: US 7,059,635 B2
(45) Date of Patent: Jun. 13, 2006

(54) HYBRID INFLATOR

(75) Inventors: Eiichi Ryobo, Hyogo (JP); Akihisa Ogawa, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 445 days.

(21) Appl. No.: 10/204,625

(22) PCT Filed: Mar. 27, 2001

(86) PCT No.: PCT/JP01/02480

§ 371 (c)(1),
(2), (4) Date: Aug. 22, 2002

(87) PCT Pub. No.: WO01/72559

PCT Pub. Date: Oct. 4, 2001

(65) Prior Publication Data

US 2003/0001370 A1    Jan. 2, 2003

(30) Foreign Application Priority Data

Mar. 28, 2000 (JP) ............................. 2002-089391
Mar. 13, 2001 (JP) ............................. 2001-069635

(51) Int. Cl.
*B62K 1/00* (2006.01)
(52) U.S. Cl. ...................... 280/741; 280/742
(58) Field of Classification Search ............... 280/736, 280/737, 740, 741, 742; 102/530, 531
See application file for complete search history.

(56) References Cited

U.S. PATENT DOCUMENTS

| 6,189,922 B1 * | 2/2001 | Parks et al. ................ 280/735 |
| 6,234,523 B1 * | 5/2001 | Tokoro et al. ............... 280/737 |
| 6,253,683 B1 * | 7/2001 | Fukabori ..................... 102/530 |
| 6,488,310 B1 * | 12/2002 | Ryobo et al. ................ 280/736 |
| 6,705,637 B1 * | 3/2004 | Goto et al. ................. 280/728.2 |
| 6,793,244 B1 * | 9/2004 | Katsuda et al. ............. 280/741 |

FOREIGN PATENT DOCUMENTS

| DE | 19936822 A1 | 3/2000 |
| EP | 0 673 809 A1 | 9/1995 |
| EP | 0 879 739 A1 | 11/1998 |
| EP | 0 949 126 A2 | 10/1999 |
| JP | 8-282427 A | 10/1996 |
| JP | 11-342823 A | 12/1999 |
| WO | 91/15381 A1 | 10/1991 |

* cited by examiner

*Primary Examiner*—Paul N. Dickson
*Assistant Examiner*—Toan C. To
(74) *Attorney, Agent, or Firm*—Birch, Stewart, Kolasch & Birch, LLP (57) ABSTRACT

A hybrid inflator in which a weight thereof and the number of manufacturing steps can be reduced is provided. First and second communication holes 125 and 135 by which first and second gas generating chambers 120 and 130 communicates with an inflator housing 102 are formed in a gas generator housing 105. Therefore, no screen is required and thus, the weight and the number of manufacturing steps can be reduced.

28 Claims, 3 Drawing Sheets

HYBRID INFLATOR

This application claims on U.S. Ser. No. 09/680,431 filed on Oct. 6, 2000, U.S. Pat. No. 6,488,310, under 35 U.S.C. § 120, and Japanese Application Nos. 2000-89391 filed on Mar. 28, 2003 and 2001-69635 filed on Mar. 13, 2001 under § 119.

This application is the national phase under 35 U.S.C. § 371 of PCT International Application No. PCT/JP01/02480 which has an International filing date of Mar. 27, 2001, which designated the United States of America.

BACKGROUND OF THE INVENTION

1. Field of the Invention

The present invention relates to an inflating-type safety system for a motor vehicle, more specifically to a hybrid inflator capable of inflating an air bag reliably and rapidly, and to an air bag system using the hybrid inflator.

2. Description of Related Art

With the development of an inflator for an inflating-type safety system of motor vehicles, a hybrid inflator using both a pressurized gas and a solid gas generating agent has been attracting attention. A main design requirement for a hybrid inflator is that the inflator inflates an air bag to a predetermined amount in a predetermined period of time so that the air bag is effectively activated. Various proposals concerning a structure to meet the requirement have heretofore been made (for example, as referred in JP-A 8-282427). Since such a hybrid inflator is manufactured to be installed in a motor vehicle, the weight and dimensions of the inflator, which have influence upon the weight of the motor vehicle, constitute an important design requirement therefore. Moreover, it is required to reduce the weight and number of parts while maintaining function as the hybrid inflator.

SUMMARY OF THE INVENTION

An object of the present invention is to provide a hybrid inflator in which a weight of the inflator can be reduced and manufacturing process can be simplified, and to provide an air bag system using such a hybrid inflator.

A hybrid inflator of the present invention can be applied to any of a single type hybrid inflator having a single gas generating chamber and a multistage inflating hybrid inflator having two (dual type) or more than three gas generating chambers.

The present invention provides, as one means for solving the above problem, a hybrid inflator for an inflating-type safety system of a vehicle provided with an air bag, which comprises an inflator housing, a gas generator provided in the inflator housing, and an ignition means chamber having ignition means joined to the gas generator, wherein the interior of the inflator housing is filled with a pressurized medium containing an inert gas, the gas generator has an outer shell formed by a gas generator housing having a plurality of communication holes, the gas generator includes, in the gas generator housing, a gas generating chamber which accommodates a gas generating agent, the gas generating chamber and the inflator housing are in communication with each other through the communication holes, each of the communication holes provided in the gas generator housing has such a size that combustion gas generated in the gas generating chamber can flow out there through but the gas generating agent can be prevented from falling outside.

This hybrid inflator is of a single type having one gas generating chamber. It is possible to prevent the gas generating agent from falling outside without using a blocking screen by adjusting the size (hole diameter) of the plurality of communication holes. Since the screen for covering the communication holes by which the inflator housing communicates with the gas generating chamber provided in the gas generator housing is not used, the weight of the hybrid inflator can be reduced by the weight of the screen. Further, since a step for mounting the screen is unnecessary, the number of manufacturing steps can be reduced, and the manufacturing step can be simplified.

Further, as another mean for solving the above problem, the present invention provides a hybrid inflator for an inflating-type safety system of a vehicle provided with an air bag, which comprises an inflator housing, a gas generator provided in the inflator housing, and an ignition means chamber having ignition means connected to the gas generator, wherein the interior of the inflator housing is filled with a pressurized medium containing an inert gas, the gas generator has an outer shell formed by a gas generator housing with a plurality of the first and second communication holes, the gas generator housing includes, therein, first and second gas generating chambers each having a gas generating agent, the first gas generating chamber and the inflator housing are in communication with each other through first communication holes, the second gas generating chamber and the inflator housing are in communication with each other through second communication holes, each of the first and/or second communication holes has such a size that combustion gas generated in the first and/or second gas generating chamber can flow out there through but the gas generating agent can be prevented from falling outside.

In the present invention, the following three modes may be employed: (a) the plurality of first communication holes are not covered with the screen, but the plurality of second communication holes are covered with the screen, (b) the first communication holes are covered with the screen, but the second communication holes are not covered with the screen, and (c) both the first and second communication holes are not covered with the screen. Among these embodiments, (c) is most preferable.

This hybrid inflator is of a dual-type having two gas generating chambers. Like in the above-described single type hybrid inflator, it is possible to prevent the gas generating agent from falling outside by adjusting a size (hole diameter) of the first and second communication holes without using a screen. Since the screen for covering the plurality of communication holes by which the inflator housing communicates with the gas generating chambers provided in the gas generator housing is not used, a weight of the hybrid inflator can be reduced by the weight of the screen. Further, since a mounting step of the screen can be omitted, the number of manufacturing steps can be reduced, and thereby, the manufacturing step can be simplified. In a conventional dual-type hybrid inflator, a screen is mounted to each of the first and second communication holes. Since the screens are not used, the number of parts can be reduced by two, and since the mounting step of the two screens can be omitted, effects of reducing a weight and simplifying manufacturing steps are extremely great.

In the hybrid inflator of the present invention, the plurality of communication holes or the plurality of first and second communication holes provided in the gas generator housing can have the same diameters. By setting the hole diameters of the communication holes the same, it becomes easy to control the amount of outflow and the outflow state of combustion gas generated by burning the gas generating agent, and additionally, manufacture of the gas generator housing can be facilitated.

In the hybrid inflator of the present invention, the plurality of communication holes or the plurality of first and second communication holes provided in the gas generator housing may have diameters in a range of 0.5 to 3 mm, more preferably in a range of 1.0 to 2.0 mm. By setting the diameter of each of the plurality of communication holes or the plurality of first and second communication holes in the predetermined range, the amount of outflow and the outflow-state of a combustion gas generated by combustion of the gas generating agent can be controlled in the communication holes, as a whole, even when some of the holes are clogged.

Further, in the hybrid inflator of the present invention, the total number of the communication holes or the first and second communication holes provided in the gas generator housing may be 100 to 600, more preferably 200 to 500. By setting the total number of the communication holes or the first and second communication holes in a predetermined range, the amount of outflow and the outflow-state of a combustion gas generated by combustion of the gas generating agent can be controlled in the communication holes, as a whole, even when some of the holes are clogged.

Further, in the dual-type hybrid inflator of the present invention, the total number of the first communication holes may be 50 to 300, more preferably 100 to 250, and the total number of the second communication holes may be 50 to 300, more preferably 100 to 250. By setting the total number of the first and second communication holes in a predetermined range, the amount of outflow and the outflow-state of a combustion gas generated by combustion of the gas generating agent can be controlled in the communication holes, as a whole, even when some of the holes are clogged.

Further, in the hybrid inflator of the present invention, the total open area of the communication holes or the first and second communication holes provided in the gas generator housing may be 100 to 600 mm$^2$, more preferable 200 to 500 mm$^2$. By setting the total open area of the communication holes or the first and second communication holes in the predetermined range, the amount of outflow and the outflow-state of a combustion gas generated by combustion of the gas generating agent can be controlled in the communication holes, as a whole, even when some of the holes are clogged.

Further, in the hybrid inflator of the present invention, the plurality of communication holes or the plurality of first and second communication holes provided in the gas generator housing may be arranged in a plurality of lines in the longitudinal direction of the gas generator housing as well as in a plurality of lines in the outer peripheral direction. By arranging the communication holes in the plurality of lines, requirements concerning the hole diameter, the total number and the opening area of the communication holes can be controlled easily, and thereby, the hybrid inflator which fulfills the requirements can be produced efficiently.

Further, as another mean for solving the above problem, the present invention provides a hybrid inflator for an inflating-type safety system of a vehicle provided with an air bag, which comprises an inflator housing, a gas generator provided in the inflator housing, and an ignition means chamber having ignition means connected to the gas generator, wherein the interior of the inflator housing is filled with a pressurized medium containing an inert gas, the gas generator has an outer shell formed by a gas generator housing having a plurality of first and second communication holes, the gas generator housing includes, therein, first and second gas generating chambers each having a gas generating agent, a first ignition means chamber having first ignition means is connected to a first gas generating chamber, a second ignition means chamber having a second ignition means is connected to a second gas generating chamber, the first gas generating chamber and the inflator housing are in communication with each other through the plurality of first communication holes, the second gas generating chamber and the inflator housing are in communication with each other through the plurality of second communication holes, each of the first and/or second communication holes has such a size that combustion gas generated in the first and second gas generating chambers can flow out there through but the gas generating agent can be prevented from falling outside, the second communication holes are disposed at a distance from the second ignition means in the widthwise direction and/or the longitudinal direction of the inflator housing.

In this invention, the expression "the second communication holes are disposed at a distance from the second ignition means in the widthwise direction and/or the longitudinal direction of the inflator housing" includes three states from the second ignition means, i.e., a state in which the second communication holes are disposed at a distance in the widthwise direction, a state in which the second communication holes are disposed at a distance in the longitudinal direction, and a state in which the second communication holes are disposed at a distance in both widthwise and longitudinal directions. The widthwise direction of the inflator housing means a direction toward the side-walls of the inflator housing with respect to the center axis of the inflator housing in its longitudinal direction.

When the second communication holes are disposed at a distance in the widthwise direction of the inflator housing, it is preferable that all of the second communication holes are disposed in different directions from the second ignition means in the widthwise direction of the inflator housing. When the communication holes are disposed in different directions in the widthwise direction of the inflator housing, it is preferable that all of the second communication holes are directed to a direction different from the second ignition means through 90° or greater in the widthwise direction.

In the hybrid inflator of the present invention, like in the above-described single type hybrid inflator, it is possible to prevent the gas generating agent from falling outside by adjusting a size (diameter) of each of the first and/or second communication holes without using a blocking screen. Since such a screen can be omitted, the weight of the inflator can be reduced, the manufacturing step can be simplified, and falling of the gas generating agent can be prevented. With respect to relation between the first and second communication holes and the screen, the above-described three modes, (a)–(c), can be employed, and the mode (c) is most preferable.

Figure 3:
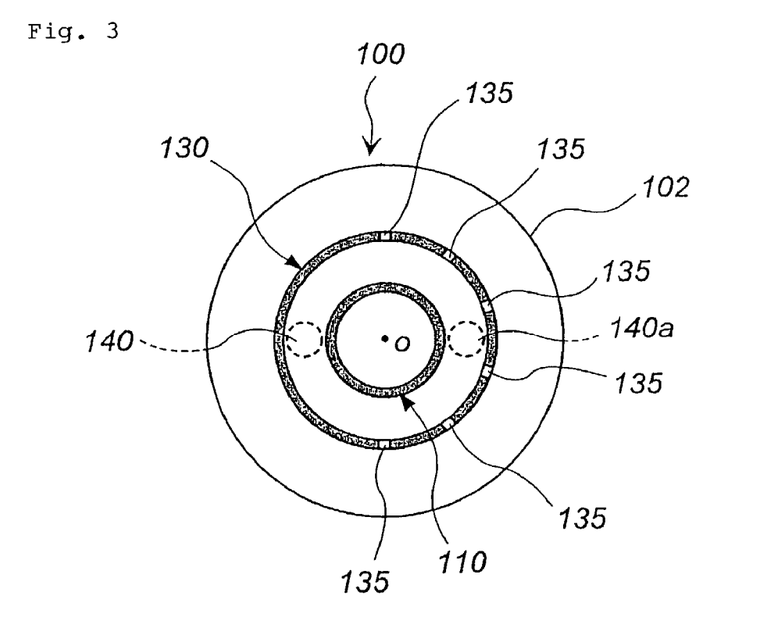
FIG. 3 is a schematic sectional view of a second gas generating chamber in the widthwise direction thereof shown in FIG. 1.

In the hybrid inflator of the present invention, when the second communication holes and the second ignition means are disposed close to each other (i.e., when they are disposed such that the widthwise direction of the inflator housing is the same direction as an example thereof shown in FIG. 3, all the gas generating agent can be burned smoothly and uniformly by employing the above-described arrangement. Without the above arrangement, in general, the gas generating agent near the second communication holes is burned smoothly, but there is an adverse possibility such that gas generating agent away from the second communication holes is not burned smoothly.

Further, the present invention includes the hybrid inflators of the above-described inventions which are further provided with at least one of the requirements selected among (1) to (3) described below:

(1) A molar ratio between an amount (A mol) of the pressurized medium and an amount (B mol) of a gas generated due to combustion of the gas generating agent is 8/2 to 1/9;

(2) A weight ratio (X/Y) of the weight (X) of the pressurized medium to the weight (Y) of the gas generating agent is 0.1 to 7; and.

(3) A pressure index determined by the following formula: $rb=\alpha P^n$ (wherein, rb: burning rate, $\alpha$: coefficient, P: pressure, n: pressure index), at combustion of the gas generating agent, is smaller than 0.8.

The pressure index (n) is obtained by two formulas, $rb_1=\alpha P_1^n$ and $rb_2=\alpha P_2^n$, after the burning rates $rb_1$ is measured in a tank at the pressure $P_1$ (70 kg/cm$^2$) and the burning rates $rb_2$ is measured in a tank at the pressure $P_2$ (100 kg/cm$^2$)

By meeting the requirements (1) and (2), a charged amount of the pressurized medium can be decreased. Consequently, even when the volume of the housing is decreased (in other words, the length and/or the width (the diameter) of the housing is decreased), a charging pressure of the pressurized medium (=the internal pressure of the housing) is not increased, but can be maintained the same as that before the volume is decreased. Preferably, A/B is 8/2 to 3/7, and X/Y is 0.5 to 5.

By meeting the requirement (3), a burning rate at the initial combustion of the gas generating agent is controlled not to increase abruptly, and thereby the internal pressure of the housing increases only slightly. Therefore, even when the thickness of the housing is reduced, a satisfactory heat-resistance can be retained. In addition, the gas generating agent is burnt stably because the internal pressure of the housing increases only slightly (in other words, the internal pressure changes a little), so that the gas generating agent can be burnt completely. Preferably, the pressure index (n) is 0.1 to 0.8, and more preferably, 0.1 to 0.7.

The gas generating agent used in the hybrid inflator of the present invention is not specially limited, and one example thereof is described below. In the hybrid inflator of the present invention, as described in 1) and 2) below, a gas generating agent accommodated in one gas generating chamber for a single type hybrid inflator, or a first gas generating agent accommodated in the first gas generating chamber and a second gas generating agent accommodated in the second gas generating chamber for a dual type hybrid inflator can be determined based on a relation with composition of pressurized medium charged in the inflator housing.

1) the pressurized medium including oxygen:

When the pressurized medium includes oxygen and an inert gas such as argon, helium (nitrogen is also included in the inert gas in the present invention), etc., the oxygen works to convert carbon monoxide and hydrogen generated due to the combustion of a gas generating agent, as a gas generating means, into carbon dioxide and vapor, while argon works to promote the thermal expansion of the pressurized medium. It is preferable to contain helium in the pressurized medium since the falling of the pressurized medium can be detected easily, for the purpose of preventing distribution of the imperfect products. Concrete compositions of the pressurized medium including oxygen are determined in accordance with gas generating agent to be used and a kind thereof, and the content of oxygen is preferably about 8 to 30 mol %. A charging pressure of the pressurized medium (=pressure in the inflator housing) is preferably 10,000 to 70,000 kPa and more preferably, 30,000 to 60,000 kPa.

As the gas generating agent in the single type hybrid inflator and the dual type hybrid inflator, a gun propellant can be used for example. As the gun propellant, a single-base gun propellant, a double-base gun propellant, and a triple-base gun propellant can be used. In addition, it is possible to use a gun propellant obtained by mixing a secondary explosive, a bonding agent, a plasticizer, and a stabilizer, and the like, and molding the resultant mixture to a desired shape.

The secondary explosive can include hexahydrotrinitrotriazine (RDX), cyclotetramethylene tetranitramine (HMX), pentaerithritol tetranitrate (PETN), and triaminoguanidine nitrate (TAGN). For example, when a gas generating agent using RDX as a secondary explosive is burned in an oxygen-absent atmosphere under a pressure of 20,670 kPa and at a combustion temperature of 3348 K, a formed gas in a combustion gas comprises 33 mol % of nitrogen, 25 mol % of carbon monoxide, 23 mol % of vapor, 8 mol % of carbon dioxide, and other gas components.

The bonding agent can include cellulose acetate, cellulose acetate butylate, cellulose acetate propiolate, ethyl cellulose, polyvinyl acetate, azide polymer, polybutadiene, polybutadiene hydride, and polyurethane; the plasticizer can include trimethylolethane trinitrate, butantriol trinitrate, nitroglycerine, bis (2,2-dintropropyl) acetal/formal, glycidyl azide, acetyltriethl citrate, and the like; and the stabilizer can include ethlcentralite, diphenylamine, and loesosinol.

A preferable ratio of the secondary explosive to the bonding agent, plasticizer and stabilizer is about 50 to 90 wt. % of secondary explosive to about 10 to 50 wt. % of bonding agent, plasticizer and stabilizer in all.

It is difficult in some cases to burn the gas generating agent of the above-described composition under normal pressure. However, in the hybrid inflator according to the present invention, since the interior thereof is maintained at a high pressure in advance, the gas generating agents can be burned stably and smoothly.

2) the pressurized medium not including oxygen:

When the pressurized medium includes substantially an inert gas such as argon, helium (nitrogen is also included in the inert gas in the present invention), etc., and when the composition does not contain oxygen, argon works to promote the thermal expansion of the pressurized medium. It is preferable to contain helium in the pressurized medium since the leakage of the pressurized medium can be detected easily for the purpose of preventing distribution of the imperfect products. Further, it is preferable that the pressurized medium does not contain oxygen. However, the pressurized medium can contain oxygen in order to improve a combustion of the gas generating agents. In that case, the amount of added oxygen is preferably not more than 10 mol %, and more preferably 5 mol %. A charging pressure of the pressurized medium is preferably 10,000 to 70,000 kPa and more preferably, 30,000 to 60,000 kPa.

As the gas generating agent accommodated in the single type hybrid inflator and the dual type hybrid inflator, it is possible to use a material including fuel and oxidizer, or fuel, oxidizer and slag-forming agent which are mixed together with bonding agent if necessary and formed into a desired shape. If such a gas generating agent is used, a gas generated by its combustion can be supplied together with the pressurized medium for developing the air bag. Especially when the gas generating agent including the slag-forming agent is used, the amount of mist discharged from the inflator can be reduced.

Preferably, the fuel can be at least one of the materials selected from a group consisting of guanidine derivative such as nitroguanidine (NQ), guanidine nitrite (GN), guanidine carbonate, amino nitroguanicine, amino guanidine nitrite, amino guanidine carbonate, diamino guanidine nitrite, diamino guanidine carbonate, and triamino guanidine nitrite. Further as the fuel, at least one of the materials selected from a group comprising tetrazole and tetrazole derivative can be used.

As oxidizer, at least one of the materials selected from a group comprising strontium nitrate, potassium nitrate, ammonium nitrate, potassium perchlorate, copper oxide, ferrous oxide, basic copper nitrate can be used. Preferable composition amount of oxidizer is 10 to 80 parts by weight, and more preferably, 20 to 50 parts by weight with respect to 100 parts by weight of fuel.

Preferably, the slag-forming agent can be at least one of the materials selected from a group consisting of acid clay, talc, bentonite, diatomaceous earth, kaolin, silica, alumina, sodium silicate, silicon nitride, silicon carbide, hydrotalsite, and a mixture thereof. Preferable composition amount of slag-forming agent is 0 to 50 parts by weight, and more preferably, 1 to 10 parts by weight with respect to 100 parts by weight of fuel.

Preferably, the bonding agent can be one or two or more materials selected from a group consisting of sodium salt of sodium carboxymethylcellulose, hydroxyethyl cellulose, starch, polyvinyl alcohol, guar gum, microcrystal cellulose, polyacrylamide and calcium stearate. Preferable composition amount of the bonding agent is 0 to 30 parts by weight, and more preferably, 3 to 10 parts by weight with respect to 100 parts by weight of fuel.

When the pressurized medium and the gas generating agent having the above-described compositions are used, it is preferable that a molar ratio (A/B) between an amount (A mol) of the pressurized medium and an amount (B mol) of a gas generated due to combustion of the gas generating agent is adjusted to 8/2 to 1/9, and more preferably 8/2 to 3/7.

As described above, the charging amount of the pressurized medium can be reduced by adjusting the molar ratio between the amount of pressurized medium charged in the hybrid inflator and the amount of a gas generated by combustion of the gas generating agent. Therefore, even when the volume of the inflator housing is reduced (i.e., even when the length and/or width (diameter) of the housing is reduced), it is possible to maintain the pressure at the same level as that before the volume is reduced, without enhancing the charging pressure (internal pressure of the housing) of the pressurized medium. In the hybrid inflator of the present invention, the weight ratio (X/Y) of the weight (X) of the pressurized medium to the weight (Y) of the gas generating agent is preferably 0.1 to 7, and more preferably 0.5 to 5.

In the above hybrid inflator, it is preferable that a pressure index determined by the following formula: $rb=\alpha P^n$ (wherein, rb: burning rate, $\alpha$: coefficient, P: pressure, n: pressure index), at the combustion of the gas generating agent, is smaller than 0.8. The pressure index (n) is preferably 0.1 to 0.8, and more preferably, 0.1 to 0.7. In this case, the pressure index (n) is obtained by being measured in accordance with the method described in the above requirement (3).

When the pressure index (n) is set to a value smaller than 0.8 in this manner, the burning rate at the initial stage of the combustion of the gas generating agent is restrained from increasing abruptly, whereby, increase of the pressure inside the housing is small. Accordingly, a sufficient pressure resistance of the housing can be maintained even if the thickness of the housing is reduced. Further, since the increase in internal pressure of the housing is small (i.e., a variation in the internal pressure is small), the gas generating agent is burned stably so that all the gas generating agent is burnt completely.

In the hybrid inflator of the present invention, as a relation between the pressurized medium and the gas generating agent, the above-described combinations 1) and 2) may be employed, and the combination 2) is more preferable.

Further, the present invention provides an air bag system comprising activation-signal outputting means including an impact sensor and a control unit, and a module case which accommodates the above-described hybrid inflator and air bag.

In the present invention, the term "gas generator" is the one having a gas generating performance to generate a high temperature combustion gas due to combustion of the gas generating means (gas generating agent) in the gas generator housing (gas generating chamber), thereby allowing the high temperature combustion gas to flow into the inflator housing. The hybrid inflator includes the gas generator in its inflator housing, and the term "inflator" is the one having a performance to flow outside, the pressurized medium existing inside of the inflator housing as well as outside of the gas generator to inflate an object to be inflated such as an air bag by flowing a high temperature combustion gas from the gas generator into the housing. The term "hybrid" means a combination of the high temperature combustion gas generated by combustion of the gas generating agent and the pressurized medium.

In the hybrid inflator of the present invention, since the screen, for covering the communication holes by which the inflator housing communicates with the gas generating chamber provided in the gas generator housing, is not used, the number of parts and manufacturing steps can be reduced, and thereby the cost can be effectively reduced because of weight-reduction of the hybrid inflator and the facilitated manufacturing process.

DETAILED DESCRIPTION OF THE PRESENT INVENTION

The present invention will be explained in detail as follows with reference to the drawings showing embodiments of the invention.

Figure 1:
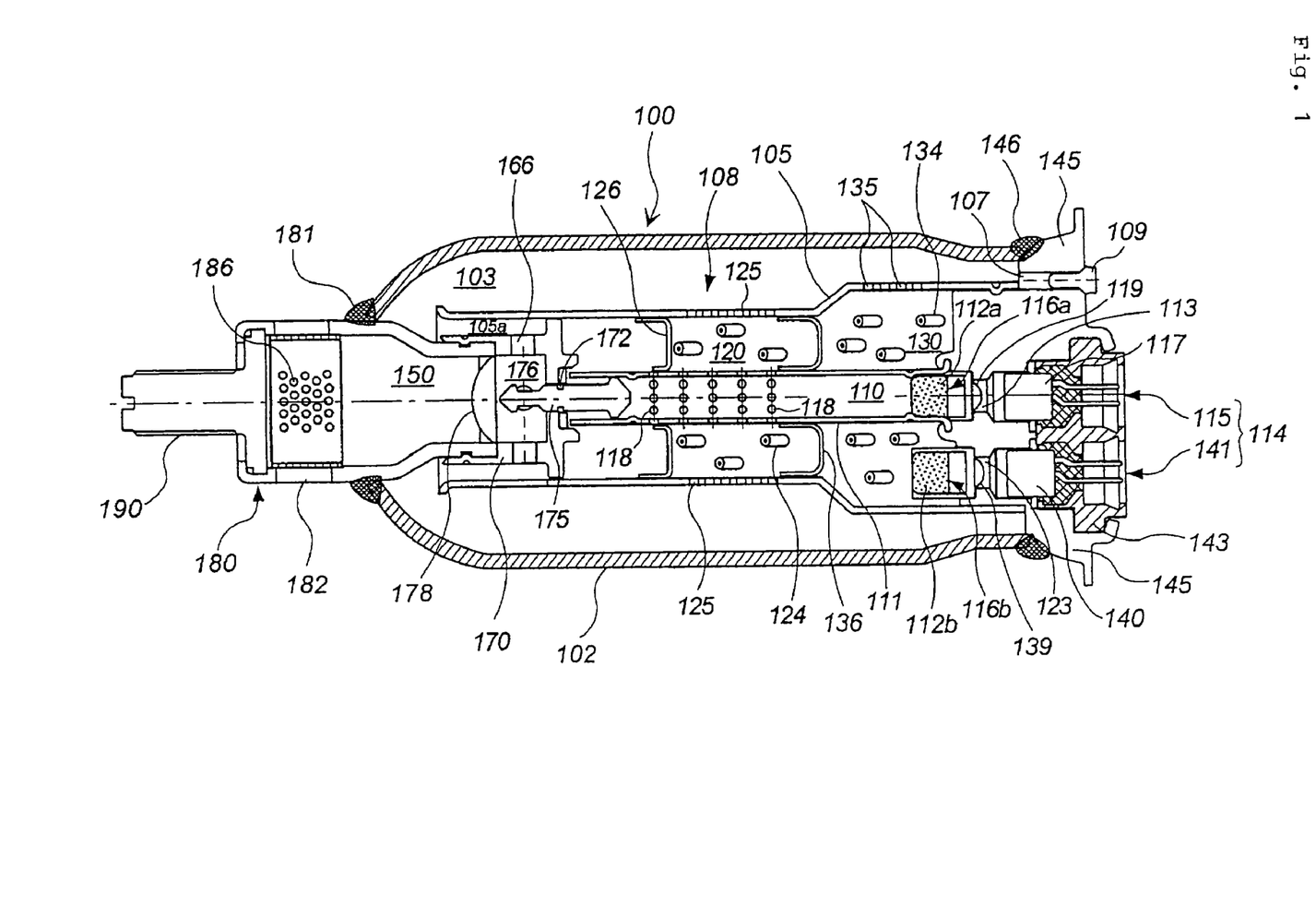
FIG. 1 is a longitudinal sectional view showing one embodiment of a hybrid inflator of the present invention.
Figure 2:
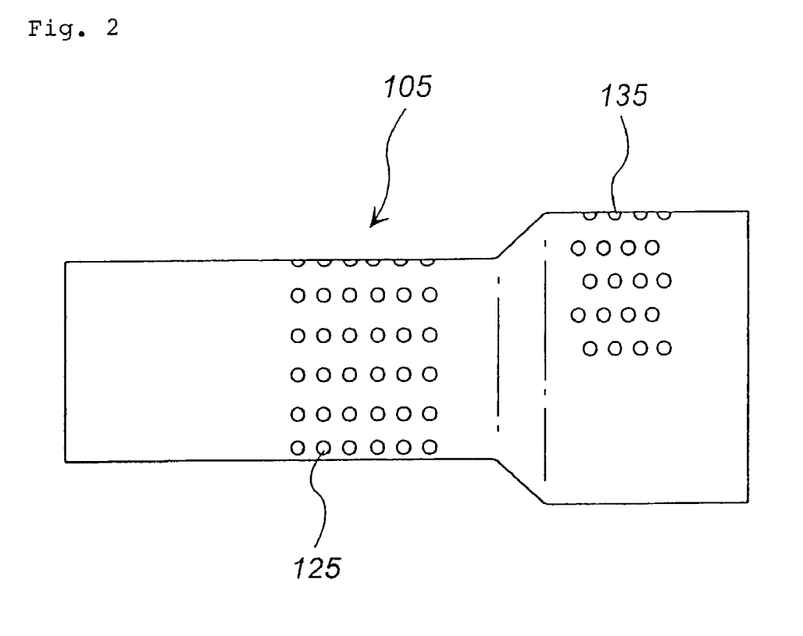
FIG. 2 is a schematic plan view of a gas generator housing in the hybrid inflator shown in FIG. 1.

FIG. 1 is a longitudinal sectional view showing one embodiment of a dual type hybrid inflator 100 having two gas generating chambers, FIG. 2 is a schematic plan view of a gas generator housing shown in FIG. 1, and FIG. 3 is a schematic sectional view of a second gas generating chamber taken along the widthwise direction thereof shown in FIG. 1. FIGS. 2 and 3 are used for explaining layout of communication holes.

As shown in FIG. 1, an inflator housing 102 comprises a cylindrical pressure resisting container, and its inner space 103 is filled with a pressurized medium and maintained at a high pressure. The pressurized medium is usually charged from a small hole 107 formed in a boss 145 connected to one end of the inflator housing 102, and the small hole 107 is closed with a seal pin 109 after the pressurized medium was charged. The inflator housing 102 can be formed to have an uniform outer diameter except its end portion on the side of a diffuser 180 (flat outer shape without constriction or the like).

An outer shell of a gas generator 108 includes a gas generator housing 105. The gas generator housing 105 includes, therein, a flame transferring means chamber 110, and a first gas generating chamber 120 and a second gas generating chamber 130 formed to surround the flame transferring means chamber 110 and disposed adjacent to each other in series in the longitudinal direction of the inflator housing 102. The gas generator 108 is disposed in the inflator housing 102, and its one end in its longitudinal direction is fixed to the boss 145 by welding.

The flame transferring means chamber 110 comprises a cylindrical housing 111, and is connected to a first igniter 117 through a booster cup 116a in which a booster agent (transfer charge) 112a is charged and a first communication passage 113 closed by a first rupturable disc 119 as a first closing means. The flame transferring means chamber 110 is in communication with the first gas generating chamber 120 through flame transferring holes 118.

The first gas generating chamber 120 surrounds the flame transferring means chamber 110, and is defined by the gas generator housing 105, the housing 111 of the flame transferring means chamber 110, a first partition wall (first retainer) 126 and a second partition wall (second retainer) 136. A desired amount of a first gas generating agent 124 is accommodated in the first gas generating chamber 120. The first gas generating chamber 120 and the inflator housing 102 are in communication with each other through a plurality of first communication holes 125.

As shown in FIG. 2, a plurality of first communication holes 125 are disposed in six rows (six holes) in the longitudinal direction of the gas generator housing 105, and disposed on the entire surface of the gas generator housing 105 in the outer peripheral direction. The plurality of first communication holes 125 are disposed in order as shown in FIG. 2, but they can be disposed staggered in the same way as the second communication holes 135.

A diameter of the first communication hole is 1.2 mm, and the total number of the first communication holes is 192, and the total opening area is 217 mm². The plurality of first communication holes 125 does not have to be disposed on the entire surface in the outer peripheral direction and may be disposed only on a portion of the surface. Alternatively, the holes may be divided into a plurality of groups and the groups of the holes may be disposed separately at an appropriate distance from one another. Being disposed on a plurality of surfaces means that, for example, a hundred and ninety-two first communication holes 125 in total are divided into two groups of 96 holes, and these two groups are disposed separately from each other. The first communication holes can be divided into more than three groups and these groups can be disposed separately from each other.

In the hybrid inflator 100 of the present embodiment, since a screen for preventing the first gas generating agent 124 from falling out is not provided and thus, the first communication holes 125 and the first gas generating agent 124 are in contact with each other.

The second gas generating chamber 130 is defined by the gas generator housing 105, the housing 111 of the flame transferring means chamber 110, the second partition wall (second retainer) 136, and the boss 145 (and second rupturable disc 139). A desired amount of a second gas generating agent 134 is accommodated therein. The second gas generating chamber 130 and the inflator housing 102 are in communication with each other through the plurality of second communication holes 135.

The plurality of second communication holes 135 are disposed, for example, as shown in FIG. 2, in the longitudinal direction of the gas generator housing 105 in four rows (four holes), and disposed on a half of the surface of the gas generator housing 105 in its outer peripheral direction (see FIG. 3). The plurality of second communication holes 135 are disposed staggered as shown in FIG. 2, but they can be disposed in order in the same way as the first communication holes 125.

A diameter of the second communication hole 135 is 1.2 mm, and the total number of the second communication holes is 128, and the total opening area is 145 mm². A plurality of the communication holes 135 may be disposed only on a portion of the surface. Alternatively, as described above, the holes may be divided into a plurality of groups and the groups of the holes may be disposed separately from one another.

In the hybrid inflator 100 of the present embodiment, since a screen for preventing the second gas generating agent 134 from falling out is not provided and thus, the second communication holes 135 and the second gas generating agent 134 are in contact with each other.

The second gas generating chamber 130 is connected to a second igniter 140 through a second communication passage closed by the second rupturable disc 139 as the second closing means. Reference number 112b represents a booster agent, and reference number 116b represents a booster cup.

Since the first igniter 117 and the flame transferring means chamber 110 are disposed on the center axis (shown with the chain line in FIG. 1, and with a center point O in FIG. 3) in the longitudinal direction of the inflator housing 102, the second igniter 140 is disposed eccentrically with respect to the center axis. Therefore, as shown in FIG. 3, the second gas generating chamber 130 is formed such that the second communication holes 135 are located on the opposite side of the second igniter 140 in the widthwise direction (radial direction). When the second communication holes 135 and the second igniter 140 are disposed close to each other, for example, (when the second igniter is located at the position 140a shown with the broken line in FIG. 3), the second communication holes 135 and the second igniter 140a are disposed to be in the same direction in the widthwise direction of the inflator. Therefore, the gas generating agent 134 in the vicinity of the second igniter 140a can be burnt well, but the gas generating agent 134 existing on the opposite side cannot be burnt enough.

Figure 4:
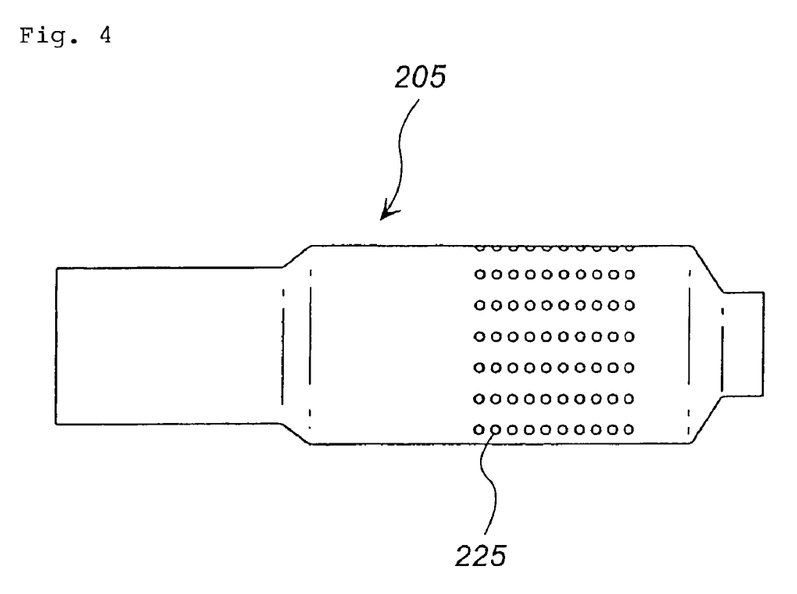
FIG. 4 is a schematic plan view of the gas generator housing of another embodiment of the hybrid inflator of the invention.

FIGS. 1 to 3 show the dual type inflator having two gas generating chambers. An example in which the present invention is applied to a single type inflator having one gas generating chamber is shown in FIG. 4. In the case of the single type hybrid inflator having a gas generator housing 205 shown in FIG. 4, a plurality of communication holes 225, by which the single gas generating chamber communicates with the inflator housing, are disposed in ten rows (ten holes) in the longitudinal direction of the gas generator housing 205 and, at the same time, disposed on the entire surface thereof in the outer circumferential direction. A diameter of the communication hole 225 is 1.2 mm, and the total number of the communication holes is 320, and the total opening area is 362 mm$^2$. In this case, the communication holes 225 do not have to be disposed only on the entire surface in the outer peripheral direction and may be disposed only on a portion of the surface. Alternatively, as described above, the holes may be divided into a plurality of groups and the groups of the holes may be disposed separately from one another.

In the hybrid inflator 100 shown in FIG. 1, irrespective of whether or not the second igniter 140 is disposed eccentrically, the first communication holes 125 and the second communication holes 135 can be formed such that some or all of the holes are directed differently in the widthwise direction of the inflator housing in order to prevent mist from discharging from the inflator housing 100.

Figure 5:
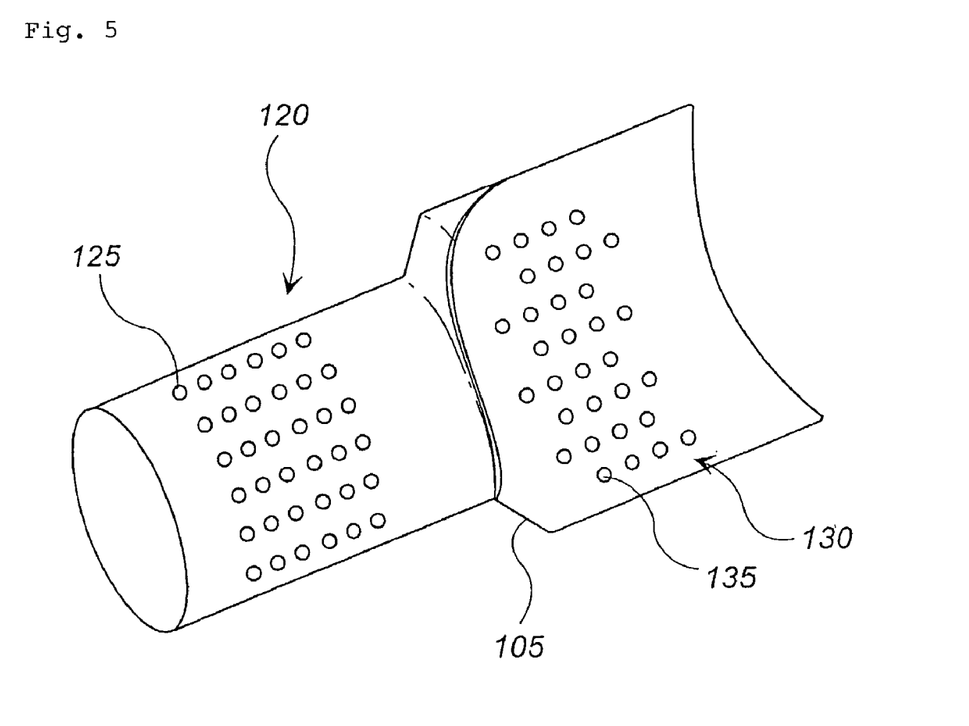
FIG. 5 is a schematic plan view of the gas generator housing of another embodiment of the hybrid inflator of the invention.

Next, one embodiment of the layout of the first communication holes 125 and second communication holes 135 will be explained based on FIG. 5. In FIG. 5, a surface of the gas generator housing 105 on the side of the second gas generating chamber 130 is cut out. In this case, "mist" in the following corresponds to a solid component (for example, a metal component) in the gas generating agents which is generated due to combustion of the gas generating agents.

As shown in FIG. 5, a plurality of first communication holes 125 are formed only on one surface of the gas generator housing 105, and a plurality of second communication holes 135 are formed only on the opposite surface of the gas generator housing 105. By disposing the first communication holes 125 and the second communication holes 135 on the widthwise-opposite sides, facing each other, of the surface of the gas generator housing 105, when a mist (first mist) generated by burning the first gas generating agent 124 in the first gas generating chamber 120 flows out from the first communication holes 125 and adheres to an opposite inner wall surface of the inflator housing 102, a gas flow (second gas flow) generated by combustion of the second gas generating agent 134 in the second gas generating chamber 130 flows into the opposite side of the inner wall surface of the inflator housing 102 on which the first mist adheres. Therefore, the first mist is prevented from scattering due to the second gas flow and from flowing outside of the hybrid inflator 100.

An amount of the second gas generating agent 134 can be equal to, larger or smaller than an amount of the first gas generating agent 124, and shapes and compositions of the first and second gas generating agents may be the same or different from each other. Volumes of the first gas generating chamber 120 and the second gas generating chamber 130 may be the same or different from each other, and the volumes can be adjusted by the first partition wall 126 and the second partition wall 136.

As described above, the flame transferring means chamber 110 is in communication with the first gas generating chamber 120, the first gas generating chamber 120 is in communication with the inflator housing 102, and further, the second gas generating chamber 130 is in communication with the inflator housing 102. With this structure, pressures in the flame transferring means chamber 110, the first gas generating chamber 120, and the second gas generating chamber 130 are maintained at high level, i.e., at the same level as the pressure in the inflator housing 102 (inner space 103).

The first gas generating chamber 120 and the second gas generating chamber 130 are disposed adjacent to each other in series in the longitudinal direction of the inflator housing 102. By disposing these chambers in series in this manner, even when the gas generating chamber is divided into two, the entire size of the hybrid inflator can be made compact, and weight increase can be limited.

The first gas generating chamber 120 and the second gas generating chamber 130 have independent passages through which gases generated by the respective combustion of the first gas generating agent 124 and the second gas generating agent 134 flow into the inflator housing 102. That is, the gas generated in the first gas generating chamber 120 flows into the inflator housing 102 from the first communication holes 125, and the gas generated in the second gas generating chamber 130 flows into the inflator housing 102 from the second communication holes 135.

The first and second gas generating chambers 120, 130 are disposed in such a manner that, when the gas generated in the first gas generating chamber 120 flows towards a diffuser port 182 inside the inflator housing 102 after passing through the first communication holes 125 of an inflow passage, the second communication holes 135 which is an inflow passage of the second gas generating chamber 130 is located in the reverse direction of the gas flowing direction with respect to the first communication holes 125 which is an inflow passage of the first gas generating chamber 120.

By disposing the first and second gas generating chambers 120, 130 in this manner, combustion in the first gas generating chamber 120 does not affect the one in the second gas generating chamber 130. Such a layout is effective in that combustion in the first gas generating chamber 120 does not affect the one in the second gas generating chamber 130 when the pressurized medium does not contain oxygen. The order of disposing the first gas generating chamber 120 and the second gas generating chamber 130 may be reversed.

An ignition means chamber 114 formed in the boss 145 includes the first and second ignition means chambers 115, 141. The first ignition means chamber 115 accommodates the first igniter 117, and the second ignition means chamber 141 accommodates the second igniter 140. The first and second ignition means chambers can be disposed in parallel, adjacent to each other in the widthwise direction of the inflator housing 102.

The first igniter 117 and the second igniter 140 are mounted on the boss 145 through an igniter collar 143. The boss 145 is fixed to the inflator housing 102 at a connecting portion 146 by welding or the like.

An adapter 170 is connected in extension of the flame transferring means chamber 110. A projectile 175 having the illustrated shape for rupturing a main rupturable disc 178 at the time of activation is mounted, through an O-ring 172, to an opening that brings the flame transferring means chamber 110 and the adapter 170 into communication with each other such that the projectile 175 straddles the flame transferring means chamber 110 and the adapter 170. A tip of the projectile 175 is located in the inner space 176 of the adapter 170. The inner space 176 and the inner space 103 of the inflator housing 102 are in communication only through a required number of gas inflow holes 166 provided on a surface of the adapter 170 facing an inner surface of the housing 105. A gas flow path 105a is formed by the inner surface of the housing 105 and an outer surface of the adapter 170. Therefore, the pressurized medium in the inner space 103 flows into the gas inflow holes 166 inevitably through the gas flow path 105a at the time of activation.

The diffuser 180 is connected to one end of the inflator housing 102. The diffuser 180 is fixed at its connecting portion 181 by welding. The main rupturable disc 178, as the main closing means, is mounted to the end of the diffuser 180 facing the projectile 175 in order to block a moving path of the pressurized medium towards the diffuser port 182 before activation. Therefore, before activation, a gas inflow space 150 and the inner space 103 of the inflator housing 102 are completely isolated from each other and thus, transmittance of the pressurized medium is blocked.

The diffuser 180 is provided at the other end with a plurality of diffuser ports 182 for sending the pressurized medium to the air bag and also with a diffuser screen 186 for removing fine particles. A stud bolt 190 for connecting the diffuser 180 with the air bag module is fixed to the outer face of the diffuser 180.

In the hybrid inflator 100, it is preferable that the above-described constituent elements are arranged symmetrically in the widthwise direction with respect to the center axis (shown as the chain line in FIG. 1), but some or all of the constituent elements may be arranged eccentrically with respect to the center axis.

In the hybrid inflator of the present invention, the arrangement of the first and second gas generating chambers can be varied as described below.

For example, the first gas generating chamber 120 and the second gas generating chamber 130 can be arranged to face each other on the opposite sides inside the inflator housing 102. In this case, the pressurized medium is charged into the space between the first gas generating chamber 120 and the second gas generating chamber 130.

Further, for example, in the inflator housing 120, the first gas generating chamber 120 (or the second gas generating chamber 130) may surround the flame transferring means chamber 110, and the second gas generating chamber 130 (or the first gas generating chamber 120) may surround the first gas generating chamber 120.

The air bag system of the present invention comprises activation-signal outputting means including an impact sensor and a control unit, and a module case in which the hybrid inflator 100 and an air bag are accommodated. The hybrid inflator 100 is connected to the activation-signal outputting means (the impact sensor and the control unit) on the side of the first igniter 117 and the second igniter 140, and the hybrid inflator 100 is connected and fixed by screwing the stud bolt 190 into the module case in which the air bag is mounted. In the air bag system having such a structure, it is possible to adjust an amount of gas generated in accordance with a degree of the impact, and to adjust the inflating speed of the air bag by appropriately setting the output condition of the activation signal in the activation-signal outputting means.

Next, the operation of the hybrid inflator 100 will be explained with reference to FIG. 1. Before the hybrid inflator 100 is activated, the pressurized medium stored in the inflator housing 102 under a high pressure exists in the first gas generating chamber 120 and the second gas generating chamber 130 which communicate with each other by means of the communication holes 125 and 135 respectively, and further exists in the flame transferring means chamber 110 through the communication holes 118, and the insides of these chambers are maintained at the same high pressure. Further, the projectile 175 is mounted to straddle between the flame transferring means chamber 110 and the inner space 176 which are maintained at the same pressure, the malfunction is prevented.

In the event of a vehicle collision, the first igniter 117 is ignited by the activation signal outputting means to rupture the first rupturable disc 119 (fixed to the boss 145 defining the first communication hole 113) to ignite and burn the booster agent 112a in the flame transferring means chamber 110, thereby generating a high temperature booster gas. When the pressure inside the flame transferring means chamber 110 is increased by the generated booster gas, the projectile 175 pushed by this pressure moves to rupture the main rupturable disc 178 with the sharp tip of the projectile 175. At that time, a portion of the booster gas flows into the gas inflow space 150 due to the rupture of the main rupturable disc 178.

Most of the booster gas flows into the first gas generating chamber 120 through the flame-transferring holes 118 to ignite and burn the first gas generating agent 124, and a desired amount of a high temperature combustion gas (corresponding to the charged amount of first gas generating agent 124) is generated. At that time, since the pressurized medium has flowed into the first gas generating chamber 120 so that this chamber 120 has been maintained at a high pressure, the combustion of the first gas generating agent 124 is stable. Since the flame transferring means chamber 110, the first gas generating chamber 120, and the second gas generating chamber 130 are partitioned from each other by a cylindrical housing 111 and a second partition wall 136, the second gas generating agent 134 is not ignited and burned. Because of the arrangement of the first communication hole 125 of the first gas generating chamber 120 and the second communication holes 135 of the second gas generating chamber 130, the second gas generating agent 134 is not ignited nor burnt by the combustion of the first gas generating agent 124.

Thereafter, since the high temperature combustion gas flows through the first communication hole 125 into the inflator housing 102 to increase the pressure therein, the further pressurized medium flows into the gas inflow space 150 through the ruptured main rupturable disc 178. The further pressurized medium which has flowed into the gas inflow space 150 in this manner is ejected from the diffuser port 182 after passing through the diffuser screen 186 and then, inflates the air bag mounted in the air bag module.

The second igniter 140 is ignited by the activation signal outputting means simultaneously or slightly (about 10 to 40 ms) after the first igniter 134 is activated, and the second rupturable disc 139 (fixed to the boss 145 defining the second communication passage 133) is ruptured to ignite and burn the booster agent 112b, and then, the second gas generating agent 134 in the second gas generating chamber 130 is ignited to generate the desired amount of a high temperature combustion gas (corresponding to the charged amount of the second gas generating agent 134). At that time, since the pressurized medium already exists in the second gas generating chamber 130 and this chamber 130 has been maintained at high pressure, the combustion state of the second gas generating agent 134 is stable. In this case, in order to ignite and burn the second gas generating agents 134, only the second igniter 140 is used and a booster can be omitted.

Further, as shown in FIGS. 1 and 3, since the second igniter 140 is disposed distantly and differently in the radial direction from the second communication holes 135, the second gas generating agent 134 in the second gas generating chamber 130 is uniformly burned. For example, if the second communication holes 135 is disposed near the second igniter 140, a portion of the second gas generating agent 134 near the second igniter 140 is smoothly burned, but the other portion of the second gas generating agent 134 located farther away from the second communication holes 135 is prone to be burned in some cases.

The high temperature combustion gas generated by the combustion of the second gas generating agent 134 flows into the inflator housing 102 through the second communication holes 135 to increase a pressure therein, the remaining pressurized medium flows into the gas inflow space 150 through the ruptured main rupturable disc 178, and is ejected from the diffuser port 182 to further inflate the air bag.

The hybrid inflator described above generates the combustion gas in two stages. The first gas generating chamber 120 can act to inhibit an inflating action of the air bag from lagging at a vehicle collision, and the second gas generating chamber 130 enables to discharge the pressurized medium completely from the inflator housing 102 and to make the air bag inflated immediately up to the satisfying safety level.

Additionally, since two gas generating chambers are provided, this hybrid inflator can also be adapted to a mode of embodiment in which a combustion gas is generated only in the first gas generating chamber 120 alone, a mode of embodiment in which a combustion gas is generated in the first and second gas generating chambers 120 and 130 simultaneously, and a mode of embodiment in which an interval between the timing of generating a combustion gas in the first gas generating chamber 120 and that of generating a combustion gas in the second gas generating chamber 130 is controlled in a desired manner.

EXAMPLE

The present invention is described more specifically below by referring to Example. However, the present invention is not limited thereto. By the way, the gas generating agent described below is shaped in a single-perforated cylinder having the outer diameter of 5.4 mm, the inner diameter of 0.7 mm and the length of 5 mm.

Example 1

A dual-type hybrid inflator 100 of the embodiment shown in FIG. 1 was produced. The details are as follows:

The inflator housing 102 was produced by using high tensile strength steels (a tensile strength of 90 kg/mm$^2$). As the pressurized medium, 2.6 mol (100 g) of a mixed gas comprising argon and helium [Ar:He=96:4 (molar ratio)] was used (the internal pressure of 32,000 kPa). As the gas generating agent, 20 g of a composition comprising nitroguanidine, strontium nitrate, carboxymethylcellulose and acid clay (34:50:9:7) was used (A/B=7.2/2.8) for each of the first and second gas generating chambers (40 g in total, which corresponds to 1.0 mol of the generated gas). A weight ratio (X/Y) between the pressurized medium and the gas generating agent was 2.5. Accordingly, at the activation, totally 3.6 moles of the gas could be used, and the total weight of the pressurized medium and the gas generating agent before the activation was 140 g. In this case, the pressure index (n) was 0.6.

The hybrid inflator 100 of the above structure had 54 mm of the diameter and 156 mm of the length (the length not including the stud bolt whose length was 20 mm). The thickness of the inflator housing 102 was 2.5 mm, and the total weight of the inflator was 1200 g. When this hybrid inflator 100 was activated by simultaneously igniting the first and second igniters, the internal pressure of the inflator housing 102 was 48,000 kPa.

The invention claimed is:

1. A hybrid inflator for an inflating-type safety system of a vehicle provided with an air bag, comprising:
   an inflator housing containing a pressurized medium including an inert gas;
   a gas generator provided in said inflator housing, said gas generator including,
     a gas generator housing provided with a plurality of communication holes,
     a gas generating chamber in which a gas generating agent is accommodated,
     said gas generating chamber and said inflator housing being in communication with each other through said communication holes, and
     each of said communication holes provided in said gas generator housing having such a size that a combustion gas generated in said gas generating chamber is permitted to flow out into said inflator housing while preventing the gas generating agent from moving out of said gas generating chamber; and
   an ignition means chamber having an ignition means connected to said gas generator, wherein
   the hybrid inflator satisfies at least one requirement selected from the following requirements (1) to (3):
   (1) A molar ratio between an amount (A mol) of the pressurized medium and an amount (B mol) of a gas generated due to combustion of the gas generating agent is 8/2 to 1/9;
   (2) A weight ratio (X/Y) of the weight (X) of the pressurized medium to the weight (Y) of the gas generating agent is 0.1 to 7; and
   (3) A pressure index determined by the following formula: $rb=\alpha P^n$ (wherein, rb: burning rate, $\alpha$: coefficient, P: pressure, n: pressure index), at the combustion of the gas generating agent, is smaller than 0.8.

2. A hybrid inflator for an inflating-type safety system of a vehicle provided with an air bag, comprising:
   an inflator housing containing a pressurized medium including an inert gas;
   a gas generator provided in said inflator housing, said gas generator including,
     a gas generator housing having a plurality of first and second communication holes,
     first and second gas generating chambers each containing a gas generating agent,
     said first gas generating chamber and said inflator housing being in communication with each other through said first communication holes, and said second gas generating chamber and said inflator housing being in communication with each other through said second communication holes, and
     said first and second communication holes having such a size that a combustion gas generated in said first and second gas generating chambers are permitted to flow out into said inflator housing while preventing the gas generating agent from moving out of said first and second gas generating chambers; and
   an ignition means chamber having ignition means connected to said gas generator, wherein the hybrid inflator satisfies at least one requirement selected from the following requirements (1) to (3):
(1) A molar ratio between an amount (A mol) of the pressurized medium and an amount (B mol) of a gas generated due to combustion of the gas generating agent is 8/2 to 1/9;
(2) A weight ratio (X/Y) of the weight (X) of the pressurized medium to the weight (Y) of the gas generating agent is 0.1 to 7; and
(3) A pressure index determined by the following formula: $rb=\alpha P^n$ (wherein, rb: burning rate, $\alpha$: coefficient, P: pressure, n: pressure index), at the combustion of the gas generating agent, is smaller than 0.8.

3. A hybrid inflator for an inflating-type safety system of a vehicle provided with an air bag, comprising:
an inflator housing containing a pressurized medium including an inert gas;
a gas generator provided in said inflator housing, said gas generator including,
a gas generator housing having a plurality of first and second communication holes,
first and second gas generating chambers each having a gas generating agent, a first ignition means chamber having first ignition means connected to a first gas generating chamber, a second ignition means chamber having second ignition means connected to a second gas generating chamber, said first gas generating chamber and said inflator housing being in communication with each other through said first communication holes, said second gas generating chamber and said inflator housing being in communication with each other through said second communication holes,
said first and second communication holes having such a size that a combustion gas generated in said first and second gas generating chambers are permitted to flow out into said inflator housing while preventing the gas generating agent from moving out of said first and second gas generating chambers, and
said second communication holes being disposed at a distance from said second ignition means in one of the widthwise direction and the longitudinal direction of said inflator housing; and
an ignition means chamber having an ignition means connected to said gas generator, wherein
the hybrid inflator satisfies at least one requirement selected from the following requirements (1) to (3):
(1) A molar ratio between an amount (A mol) of the pressurized medium and an amount (B mol) of a gas generated due to combustion of the gas generating agent is 8/2 to 1/9;
(2) A weight ratio (X/Y) of the weight (X) of the pressurized medium to the weight (Y) of the gas generating agent is 0.1 to 7; and
(3) A pressure index determined by the following formula: $rb=\alpha P^n$ (wherein, rb: burning rate, $\alpha$: coefficient, P: pressure, n: pressure index), at the combustion of the gas generating agent, is smaller than 0.8.

4. A hybrid inflator as claimed in claim 1, wherein the plurality of communication holes are not covered with a screen.

5. A hybrid inflator as claimed in claim 1, wherein said gas generating agent is in contact with the plurality of communication holes provided in said gas generator housing.

6. A hybrid inflator as claimed in claim 1, wherein the plurality of communication holes provided in said gas generator housing have the same hole diameters.

7. A hybrid inflator as claimed in claim 1, wherein the plurality of communication holes provided in said gas generator housing have hole diameters in a range of 0.5 to 3 mm.

8. A hybrid inflator as claimed in claim 1, wherein the total number of the plurality of communication holes provided in said gas generator housing is 100 to 600.

9. A hybrid inflator as claimed in claim 1, wherein the total open area of the plurality of communication holes provided in said gas generator housing is 100 to 600 mm$^2$.

10. A hybrid inflator as claimed in claim 1, wherein the plurality of communication holes provided in said gas generator housing are disposed in a plurality of lines in the longitudinal direction of said gas generator housing and in a plurality of the lines in the circumferential direction.

11. An air bag system comprising:
activation-signal outputting means including an impact sensor and a control unit; and
a module case in which a hybrid inflator as claimed in claim 1 and an air bag are accommodated.

12. A hybrid inflator as claimed in claim 2 or 3, wherein, in the first communication holes and the second communication holes provided in said gas generator housing, the total number of said first communication holes is 50 to 300, and the total number of said second communication holes is 50 to 300.

13. A hybrid inflator as claimed in claim 3, wherein, in the first communication holes and the second communication holes provided in said gas generator housing, the first communication holes are disposed in a plurality of the lines in the longitudinal direction of said gas generator housing and on the entire surface in the circumferential direction, and the second communication holes are disposed in a plurality of the lines in the longitudinal direction of said gas generator housing and on a half or less of the surface in the circumferential direction.

14. A hybrid inflator as claimed in claim 3 or 13, wherein said gas generator further includes a flame transferring means chamber, said flame transferring means chamber is disposed in extension in the longitudinal direction of said first ignition means chamber and is in communication with said first gas generating chamber, said second ignition means connected to said second gas generating chamber is disposed eccentrically with respect to the center axis of said inflator housing in the longitudinal direction.

15. A hybrid inflator as claimed in claim 3, wherein said first and second ignition means chambers are disposed adjacent to each other as well as in parallel in the widthwise direction of said inflator housing, said first ignition means chamber is disposed on the center axis in the longitudinal direction of said inflator housing.

16. A hybrid inflator as claimed in claim 2 or 15, wherein said first and second gas generating chambers have independent inflow paths for gases generated therein towards said inflator housing.

17. A hybrid inflator as claimed in claims 2 or 3, wherein at least one of the first communication holes and the second communication holes are not covered with a screen.

18. A hybrid inflator as claimed in claim 2, wherein at least a portion of the first communication holes and the second communication holes provided in said gas generator housing are formed in different directions in the widthwise direction of said inflator housing.

19. A hybrid inflator as claimed in claim 2, wherein said first and second gas generating chambers are disposed adjacent to each other in series in the longitudinal direction of said inflator housing.

20. A hybrid inflator as claimed in claim 2, wherein said first and second gas generating chambers are disposed to face each other in series in the longitudinal direction of said inflator housing.

21. A hybrid inflator as claimed in claim 2, wherein said first and second gas generating chambers are disposed in parallel, adjacent to each other or at a distance from each other in the widthwise direction of said inflator housing.

22. A hybrid inflator for an inflating-type safety system of a vehicle, comprising:
- an inflator housing that accommodates a pressurized medium;
- a first housing provided in the inflator housing and containing a first gas generating agent, the first housing having a first communication hole that allows the pressurized medium and gas generated in the first housing to flow therethrough while retaining the first gas generating agent in the first housing;
- a second housing provided in the inflator housing and containing a second gas generating agent, the second housing having a second communication hole that allows the pressurized medium and gas generated in the second housing to flow therethrough while retaining the second gas generating agent in the second housing; and
- a partition wall provided between the first housing and the second housing.

23. The hybrid inflator as claimed in claim 22, wherein the first communication hole and the second communication hole are not covered.

24. A hybrid inflator as claimed in claim 22, wherein the first gas generating agent makes contact with the first communication hole and the second gas generating agent makes contact with the second communication hole.

25. The hybrid inflator as claimed in claim 22, further comprising:
- a first ignition unit that ignites the first gas generating agent; and
- flame transferring means, extending inside the first housing along a longitudinal direction of the housing, for transferring flame generated by the first ignition unit to the first gas generating agent.

26. The hybrid inflator as claimed in claim 22, further comprising:
- a second ignition unit that ignites the second gas generating agent, the second ignition unit being connected to the second housing such that the second ignition unit is disposed eccentrically with respect to a center axis of the inflator housing.

27. The hybrid inflator as claimed in claim 22, wherein said first housing and the second housing are disposed adjacent to each other in series in a longitudinal direction of the inflator housing.

28. The hybrid inflator as claimed in claim 22, further comprising:
- a space provided inside the inflator housing and in fluid communication with the pressurized medium accommodating chamber.

* * * * *

UNITED STATES PATENT AND TRADEMARK OFFICE
CERTIFICATE OF CORRECTION

| | | |
|---|---|---|
| PATENT NO. | : 7,059,635 B2 | Page 1 of 1 |
| APPLICATION NO. | : 10/204625 | |
| DATED | : June 13, 2006 | |
| INVENTOR(S) | : Eiichi Ryobo et al. | |

It is certified that error appears in the above-identified patent and that said Letters Patent is hereby corrected as shown below:

<u>Title page,</u>

In item [30] Foreign Application Priority Data, please change "2002-089391" to --2000-089391--

Please insert the following:

Related U.S. Application Data, item

(61)         Application No. 09/680,431, filed on October 6, 2000, now Pat. No. 6,488,310.

Signed and Sealed this

Seventh Day of August, 2007

JON W. DUDAS
*Director of the United States Patent and Trademark Office*